United States Patent
Tomita et al.

(10) Patent No.: US 6,331,324 B1
(45) Date of Patent: Dec. 18, 2001

(54) SOYBEAN CURD PUREE, AND PROCESS AND APPARATUS FOR PREPARING THE SAME

(75) Inventors: Mamoru Tomita; Kazuyoshi Sotoyama, both of Kanagawa; Ryozo Watanabe, Tokyo; Kenji Mizuguchi, Kanagawa; Hideo Shidara, Tokyo; Shoji Wakao; Masanori Hattori, both of Kanagawa; Nobuyuki Motoyoshi, Tokyo, all of (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 0 days.

(21) Appl. No.: 09/581,554
(22) PCT Filed: Jul. 15, 1998
(86) PCT No.: PCT/JP98/03183
    § 371 Date: Jul. 14, 2000
    § 102(e) Date: Jul. 14, 2000
(87) PCT Pub. No.: WO99/35920
    PCT Pub. Date: Jul. 22, 1999

(30) Foreign Application Priority Data

Jan. 14, 1998 (JP) .................................. 10-018052
Mar. 5, 1998 (JP) .................................. 10-071372

(51) Int. Cl.$^7$ ........................................................ A23L 1/20
(52) U.S. Cl. ........................ 426/634; 426/656; 99/483; 99/353; 99/484; 99/510
(58) Field of Search .................................. 426/634, 656; 99/483, 353, 484, 510

(56) References Cited

U.S. PATENT DOCUMENTS

| | | |
|---|---|---|
| 4,678,676 | * 7/1987 | Ishizuka et al. . |
| 4,816,266 | * 3/1989 | Rowat . |

FOREIGN PATENT DOCUMENTS

| | | |
|---|---|---|
| 59-71641 | 4/1984 | (JP) . |
| 62-259561 | 11/1987 | (JP) . |
| 2-49557 | 2/1990 | (JP) . |
| 2-86747 | 3/1990 | (JP) . |
| 3-155764 | 7/1991 | (JP) . |
| 3-191762 | 8/1991 | (JP) . |
| 6-46784 | 2/1994 | (JP) . |

* cited by examiner

Primary Examiner—Anthony J. Weier
(74) Attorney, Agent, or Firm—Oblon, Spivak, McClelland, Maier & Neustadt, P.C.

(57) ABSTRACT

A soybean curd puree which can be applied to various foods and are useful for expansion of applications of soybean milk, and a process and apparatus for preparing the same, and the apparatus includes a system in which a raw material tank, heating apparatus, a holding pipe, first emulsifying dispersion apparatus, cooling apparatus and second emulsifying dispersion apparatus are arranged in that order, and coagulant supply apparatus connected between the heating apparatus and the holding pipe, and the process includes adding the coagulant to the soy milk, holding the temperature thereof at 40 to 90° C. to form a coagulated product, pre-crushing the product by the first emulsifying dispersion apparatus, followed by cooling to 10 to 35° C., and crushing the product by the second emulsifying dispersion apparatus into particles having the average particle diameter of 2 to 15 μm and 90% particles diameter of not more than 35 μm.

8 Claims, 1 Drawing Sheet

SOYBEAN CURD PUREE, AND PROCESS AND APPARATUS FOR PREPARING THE SAME

BACKGROUND OF THE INVENTION

1. Field of the Invention

The present invention relates to a tofu (soybean curd) puree that can be applied to various food products and is useful in expanding the uses of soy milk, and to a method and apparatus for manufacturing this tofu puree. More particularly, the present invention relates to a tofu puree having the physical and chemical properties of (a) the viscosity is 20 to 3000 mPa·s, (b) the dynamic storage modulus is 0.2 to 600 Pa, (c) the dynamic loss modulus is 0.2 to 250 Pa, and (d) the particles contained in the tofu puree have an average size of 2 to 15 µg m and a 90% particle size of 35 µm or less (hereinafter (a) to (d) will sometimes be collectively referred to as "the specified physical and chemical properties), and that has no graininess, a superior texture, and good taste, and to a method and apparatus for manufacturing this tofu puree.

In this Specification, all percentages (%) are by weight unless otherwise specified, with the exception of particle distributions.

In this Specification, "Average particle size" refers to the particle diameter corresponding to 50% in the cumulative particle distribution, and the "90% particle size" refers to the particle diameter corresponding to 90% in the cumulative particle distribution.

2. Description of the Prior Art

In the past, as a method for manufacturing a tofu paste, a technique in which tofu with a water content of 87% is directly made into a paste with a silent cutter or the like has been disclosed (Japanese Laid-Open Patent Publication 6-46784; hereinafter referred to as Prior Art 1).

And a technic which comprises adding a coagulant to soy milk, allowing this mixture to stand for about 30 minutes at 80° C. to coagulate the soy milk, pressing this product to lower the water content to between 70 and 80%, and then making this into a paste with a high-speed cutter or the like has also been disclosed (Japanese Laid-Open Patent Publication 2-86747; hereinafter referred to as Prior Art 2). Further, a technic which comprises adding a coagulant to 80° C. soy milk and making a paste with a homogenizer has also been disclosed (Japanese Laid-Open Patent Publication 59-71641; hereinafter referred to as Prior Art 3).

Unfortunately, the following problems were encountered with this prior art.

A conventional tofu paste is produced, as mentioned above, from the tofu with or without being subjected to a water removal treatment, that is, after completely coagulating the soy milk, and therefore, as will be clear from the test examples given below, the viscosity thereof exceeds 3000 mPa·s, the dynamic storage modulus exceeds 600 Pa, the dynamic loss modulus exceeds 250 Pa, the average particle size exceeds 15 µm, and the 90% particle size exceeds 35 µm, and therefore, there has been the problem that the product has graininess and has a poor texture.

The paste produced by adding a coagulant to 80° C. soy milk and homogenizing the mixture with a homogenizer is known, as above, but because this paste is produced with a homogenizer alone, as will be clear from the test examples given below, the average particle size exceeds 15 µm and the 90% particle size exceeds 35 µm, so the problems of graininess and poor texture thereof are encountered.

A tofu paste similar to a tofu puree was known in the past, as mentioned above, but a tofu puree, having the physical and chemical properties of (a) the viscosity is 20 to 3000 mPa·s, (b) the dynamic storage modulus is 0.2 to 600 Pa, (c) the dynamic loss modulus is 0.2 to 250 Pa, and (d) the particles contained in the tofu puree have an average size of 2 to 15 µm and a 90% size of 35 µm or less, and having no graininess, a superior texture, and a good taste, was not known.

In light of the above situation with prior art, the inventors have accomplished the present invention upon discovering that it is possible to manufacture a tofu puree whose viscosity, dynamic storage modulus, dynamic loss modulus, and size of the particles contained in the tofu puree meet specific numerical requirements, and which has no graininess, a superior texture, and a good taste, and therefore has many outstanding qualities unavailable in the past, by using an apparatus for manufacturing a tofu puree comprising a system in which a raw material tank, heating means, a holding pipe, first emulsifying dispersion means, cooling means, and second emulsifying dispersion means are arranged in that order, and coagulant supply means for supplying a coagulant, which is linked to this system between the heating means and the holding pipe, and by using the process comprises adding a coagulant to soy milk, holding the temperature at 40 to 90° C. to coagulate the mixture, pre-crushing this coagulated product by first emulsifying dispersion means, cooling it to between 10° C. and 35° C., and crushing this pre-crushed product by second emulsifying dispersion means to particles having an average particle size of 2 to 15 µm and a 90% particle size of 35 µm or less.

SUMMARY OF THE INVENTION

The present invention provides a tofu puree that can be applied to various food products and is useful in expanding the uses of soy milk, and to a method and apparatus for manufacturing this tofu puree. The present invention relates to a method for manufacturing a tofu puree, by using an apparatus for manufacturing a tofu puree, which comprises a system in which a raw material tank, heating means, a holding pipe, first emulsifying dispersion means, cooling means, and second emulsifying dispersion means are arranged in that order, and coagulant supply means for supplying a coagulant, which is linked to this system between the heating means and the holding pipe, and by using the process comprising adding a coagulant to soy milk, holding the temperature at 40 to 90° C. to coagulate the mixture, pre-crushing this coagulated product by first emulsifying dispersion means, cooling it to between 10° C. and 35° C., and crushing this pre-crushed product by second emulsifying dispersion means to particles having an average particle size of 2 to 15 µm and a 90% particle size of 35 µm or less, and relates to a tofu puree having the physical and chemical properties of a) the viscosity is 20 to 3000 mPa·s, b) the dynamic storage modulus is 0.2 to 600 Pa, c) the dynamic loss modulus is 0.2 to 250 Pa, and d) the particles contained in the tofu puree have an average size of 2 to 15 µm and a 90% particle size of 35 µm or less.

DESCRIPTION OF THE INVENTION

It is an object of the present invention to provide a tofu puree having the specified physical and chemical properties, no graininess, a superior texture, a good taste, and many superior qualities unavailable in the past, and to a method and apparatus for manufacturing this tofu puree.

The first aspect of the present invention for achieving the stated object is a tofu puree having the following physical and chemical properties (a) to (d):

(a) the viscosity is 20 to 3000 mPa·s;

(b) the dynamic storage modulus is 0.2 to 600 Pa;

(c) the dynamic loss modulus is 0.2 to 250 Pa; and (d) the particles contained in the tofu puree have an average size of 2 to 15 μm and a 90% particle size of 35 μm or less.

The second aspect of the present invention for achieving the stated object is a method for manufacturing a tofu puree, which comprises adding a coagulant to soy milk, holding the temperature at 40 to 90° C. to coagulate the mixture, pre-crushing this coagulated product by first emulsifying dispersion means, cooling it to between 10° C. and 35° C., and crushing this pre-crushed product by second emulsifying dispersion means to particles having an average particle size of 2 to 15 μm and a 90% particle size of 35 μm or less. In preferred embodiments, the solids content of the soy milk is 5 to 15 wt % (hereinafter referred to as Embodiment 1), the coagulant is a substance selected from the group consisting of gluconic δ-lactone, calcium acetate, calcium gluconate, calcium lactate, calcium sulfate, calcium chloride, and magnesium chloride, or a mixture of two or more of these substances (hereinafter referred to as Embodiment 2), and the amount of the coagulant to be added is 1 to 7 wt % with respect to the soy milk solids (hereinafter referred to as Embodiment 3).

The third aspect of the present invention for achieving the stated object is an apparatus for manufacturing a tofu puree, which comprises a system in which a raw material tank, heating means, a holding pipe, first emulsifying dispersion means, cooling means, and second emulsifying dispersion means are arranged in that order, and coagulant supply means for supplying a coagulant, which is linked to this system between the heating means and the holding pipe. In preferred embodiments, the first emulsifying dispersion means is a shear pump or a Milder® (hereinafter referred to as Embodiment 4), and the first emulsifying dispersion means is a homogenizer, a shear pump, or a Milder® (hereinafter referred to as Embodiment 5).

The present invention will now be described in detail. In order to facilitate an understanding of the present invention, the description will begin with the second aspect of the present invention.

As the starting raw material, any soy milk manufactured by a standard process can be used in the method of the present invention. To give a specific example, as described in detail in Reference Example 1, it is possible to use a soy milk manufactured by soaking soybeans in water for 12 hours, grinding the beans in a grinder while adding water, smothering this mash, and separating the lees with a separator. If needed, soy protein (such as separated soy protein (New Fujipro SE; made by Fuji Seiyu)) can be suitably added to the raw material soy milk.

In Embodiment 1 of the method of the present invention, the physical and chemical properties such as viscosity, dynamic storage modulus, and dynamic loss modulus are further improved, and a better texture achieved, by setting the solids content of the starting raw material soy milk between 5 and 15%.

Any coagulant can be used in the method of the present invention, as long as the substance is permitted to use for a food additive and has a function capable of coagulating soy milk. In Embodiment 2 of the method of the present invention, the soy milk can be coagulated more quickly, without producing any unpleasant taste, by using as a coagulant a substance selected from the group consisting of gluconic δ-lactone, calcium acetate, calcium gluconate, calcium lactate, calcium sulfate, calcium chloride, and magnesium chloride, or a mixture of two or more of these substances.

The coagulant used in the method of the present invention can be added to the soy milk in an amount capable of coagulating the soy milk, and to improve the viscosity, dynamic storage modulus, dynamic loss modulus, and other such physical and chemical properties, and to improve the texture, the coagulant is added in an amount of 1 to 7% with respect to the solids content of the soy milk, as is described in Embodiment 3 of the method of the present invention.

In order for the soy milk to react with the coagulant uniformly, the two must be mixed uniformly. Uniform mixing can be accomplished by setting the flow rate of the soy milk at 20 mL/second or higher and the coagulant addition rate at 0.2 mL/second or higher, by any of various agitators used for this purpose in a batch process, or an inline setup employed for continuous manufacture.

The coagulated soy milk is produced in the method of the present invention by holding the temperature of the soy milk between 40 and 90° C. If the temperature thereof is outside of this range, a favorable tofu puree having the specified physical and chemical properties will not be obtained, and the texture thereof will be unsatisfactory. The holding time required to coagulate the soy milk will vary with the solids content of the soy milk, the type of coagulant, and the amount of the coagulant to be added, but is usually between 2 and 60 seconds, and preferably between 2 and 20 seconds.

In the case of an inline setup, the coagulated soy milk is produced in the method of the present invention by heating the soy milk to between 40 and 90° C. with a plate heater (such as one made by Morinaga Engineering Co., Ltd.) or the like, and sending a mixture of soy milk and coagulant at a constant flux (flow rate) through a holding pipe capable of achieving a holding time of 2 to 60 seconds.

There are no particular restrictions on the first emulsifying dispersion means used in the pre-crushing of the coagulated soy milk in the method of the present invention as long as the coagulated soy milk can be pre-crushed, and an inline means is preferable when continuous manufacture is taken into account, and a shear pump (such as one made by Yasuda Finete) or a Milder® (such as one made by Ebara Seisakusho) is preferable, as described in Embodiment 4 of the manufacturing apparatus of the present invention.

In the method of the present invention, the pre-crushing of the coagulated soy milk is accomplished using the above-mentioned apparatus. When the coagulated soy milk is pre-crushed using this apparatus, it is usually crushed to an average particle size of 10 to 50 μM. More specifically, when using a milder, the coagulated soy milk can be pre-crushed to a suitable average particle size between 10 and 50 μm by suitably varying the speed of the milder to between 3000 and 15,000 rpm. If this pre-crushing is not carried out, a favorable tofu puree with the specified physical and chemical properties will not be obtained, and the texture thereof will also be poor.

In the method of the present invention, the resultant product being crushed as above, so called as the pre-crushed product here, is cooled to between 10 and 35° C. With an inline setup, the pre-crushed product is cooled to this temperature by being pumped through a plate cooler (such as one made by Morinaga Engineering Co., Ltd.). If the temperature is over 35° C., overheating will occur as a result of frictional heat in the subsequent crushing step, a favorable tofu puree with the specified physical and chemical properties will not be obtained, and the texture thereof will be poor, and the taste will also be unpleasant. If the temperature is below 10° C., on the other hand, the viscosity of the pre-crushed product will be so high that crushing thereof will be inadequate, and the treatment with the subsequent second emulsifying dispersion means will be unsatisfactory, so a favorable tofu puree with the specified physical and chemical properties will not be obtained, the tofu puree has graininess, the texture thereof will be poor, and the taste will also be unpleasant.

There are no particular restrictions on the second emulsifying dispersion means used to crush the pre-crushed product in the method of the present invention as long as it is capable of further crushing the particles contained in the pre-crushed product to an average particle size of 2 to 15 μm and a 90% particle size of 35 μm or less, and an inline means is preferable when continuous manufacture is taken into account, and a homogenizer (such as one made by Sanmaru Kikai Kogyo), a shear pump (such as one made by Yasuda Finete), or a milder (such as one made by Ebara Seisakusho) is preferable, as described in Embodiment 5 of the manufacturing apparatus of the present invention.

The pre-crushed product is crushed in the method of the present invention by using the above-mentioned apparatus to further crush the particles contained in the pre-crushed product to an average particle size of 2 to 15 μm and a 90% particle size of 35 μm or less. More specifically, when a homogenizer is used, the particles contained in the pre-crushed product can be crushed to an average particle size of 2 to 15 μm and a 90% particle size of 35 μm or less by suitably varying the treatment pressure to between 2 and 150 MPa, which allows for the manufacture of a tofu puree in which the particles contained therein have an average particle size of 2 to 15 μm and a 90% particle size of 35 μm or less. It is preferable for this to be carried out under cooling to keep the treatment temperature at a constant level or lower, such as 25° C. in order to prevent the tofu puree from being heated by frictional heat.

If the particles contained in the crushed product being crushed as above, so called as the tofu puree here, are outside the ranges of an average particle size of 2 to 15 μm and a 90% particle size or 35 μm or less, a favorable tofu puree having the specified physical and chemical properties will not be obtained, and the texture will thereof also be unsatisfactory.

As will be clear from the examples given below, the tofu puree manufactured by the above method of the present invention has the specified physical and chemical properties, has no graininess, has a superior texture, and has a good taste. Specifically, the tofu puree of the first invention of the present invention is useful in expanding the applications of soy milk because it has the specified physical and chemical properties as discussed above, it has no graininess, has a superior texture, good taste, and can be applied to a variety of foods.

Next, the third aspect of the present invention, which is the manufacturing apparatus of the present invention, will be described in specific terms through reference to FIG. 1, which illustrates an example of an inline manufacturing apparatus. The numbers of the elements in this example will be given in parentheses in order to facilitate correspondence of the elements in the example given below to the elements of the present invention. The reason that the present invention is described through correspondence to the numbers in the examples given below is merely to facilitate an understanding of the present invention, and this is not intended to limit the technological scope of the present invention to the examples.

FIG. 1 is a diagram of an example of the apparatus of the present invention for manufacturing a tofu puree.

The apparatus of the present invention for manufacturing a tofu puree has a system in which a raw material tank, a heating means, a holding pipe, a first emulsifying dispersion means, a cooling means, and a second emulsifying dispersion means are arranged in that order, and coagulant supply means for supplying a coagulant, which is linked to this system between the heating means and the holding pipe.

In the apparatus of the present invention for manufacturing a tofu puree, the raw material tank (1) can be any type of tank as long as it can hold soy milk and is sanitary for food handling.

A metering pump (2) with a flux regulator valve is disposed downstream from the raw material tank (1), and a heating means (3) is disposed downstream from the metering pump (2).

The heating means is an apparatus for heating a liquid, and can be a plate heater, a tubular heater, or any of various other heat exchangers. Steam and hot water are examples of a heat source (4). It is preferable to provide the heating means (3) with a temperature controller (5) that automatically controls the temperature of the liquid at the outlet from the heating means (3). The heating means (3) need not be a single means, and can be one capable of heating in stages by a plurality of heat exchangers. A holding pipe (6) is disposed downstream from the heating means (3).

The holding pipe (6) holds the mixture of soy milk and coagulant for a specific time at a specific temperature to form the coagulated soy milk. The coagulant supply means (7) for supplying a coagulant is linked between the heating means and the holding pipe.

The coagulant supply means (7) comprises a coagulant tank (8) and metering pump (9) with a flux regulator value, and is capable of supplying the coagulant in specific amounts to the soy milk that has been heated to between 40 and 90° C. by the heating means. The first emulsifying dispersion means (10) is disposed downstream from the coagulant supply means (7) and the holding pipe (6).

As mentioned above, there are no particular restrictions on the first emulsifying dispersion means (10) as long as it is able to pre-crush the coagulated soy milk, and with an inline setup, a shear pump or a Milder® can be used, as described in Embodiment 4 of the manufacturing apparatus of the present invention. The cooling means (11) is disposed downstream from the first emulsifying dispersion means (10).

The cooling means (11) is an apparatus for cooling a liquid, and can be a plate cooler, a tubular heater, or any of various other heat exchangers. Steam and hot water are examples of a coolant (12). It is preferable to provide the cooling means (11) with a temperature controller (13) that automatically controls the temperature of the liquid at the outlet from the cooling means (11). The cooling means (11) need not be a single means, and can be one capable of heating in stages by a plurality of heat exchangers. The second emulsifying dispersion means (14) is disposed downstream from the cooling means (11).

As mentioned above, there are no particular restrictions on the second emulsifying dispersion means (14) as long as it is able to further crush the particles contained in the pre-crushed product to an average particle size of 2 to 15 μm and a 90% particle size or 35 μm or less, and with an inline setup, a homogenizer, a shear pump, or a milder can be used, as described in Embodiment 5 of the manufacturing apparatus of the present invention.

If the various apparatus of the present invention can be sterilely sealed and the tofu puree can be sterilely manufactured, then a tofu puree with no graininess, a superior texture, and a good taste can be mass produced for supply to the market without any microbial contamination, so this is particularly favorable for example applications to various types of food.

The present invention will now be described in detail through test examples, and the following test methods were employed in the present invention.

(1) Measuring Viscosity of Samples

Each prepared sample was allowed to stand for 24 hours at 10° C., after which a No. 2 or No. 4 rotor was mounted on a B-type viscometer (DV L-BII, made by Tokimec), and the viscosity was measured at a rotor speed of 60 rpm.

(2) Measuring Dynamic Storage Modulus and Dynamic Loss Modulus of Samples

Each prepared sample was allowed to stand for 24 hours at 10° C. after which an ARES visco-elasticity measurement system (made by Rheometric Scientific F.E.) was used to measure the dynamic storage modulus and dynamic loss modulus at a frequency of 50.0 rad/s.

(3) Measuring Average Particle Aize and 90Particle Size of Samples

Each prepared sample was allowed to stand for 24 hours at 10° C., after which a laser diffraction type of particle size distribution measurement apparatus (LA-500, made by Horiba Seisakusho) was used to measure the average particle size (the particle diameter corresponding to 50% in the cumulative particle distribution) and the 90% particle size (the particle diameter corresponding to 90% in the cumulative particle distribution).

(4) Measuring Texture of Samples

The prepared samples were subject to a sensory test by using the following evaluation method by a panel composed of 20 men and women, ages 20 to 40. Each sample was evaluated from 0 to 3 on the following scale.

0 points: good texture 1 point: fair texture 2 points: somewhat poor texture 3 points: poor texture The score for each sample was averaged, and an evaluation was made on the basis of the following criteria.

good: 0.5 point or less fair: at least 0.5 but less than 1.5 points somewhat poor: at least 1.5 but less than 2.5 points poor: at least 2.5 but less than 3.0 points (5) Testing Taste of Samples The prepared samples were subjected to a sensory test by using the following evaluation method by a panel composed of 20 men and women, ages 20 to 40. Each sample was evaluated from 0 to 3 on the following scale.

0 points: good taste 1 point: fair taste 2 points: somewhat poor taste 3 points: poor taste The score for each sample was averaged, and an evaluation was made on the basis of the following criteria.

good: 0.5 point or less fair: at least 0.5 but less than 1.5 points somewhat poor: at least 1.5 but less than 2.5 points poor: at least 2.5 but less than 3.0 points Test Example 1

This test was conducted in order to compare the method of the present invention with prior art.

(1) Preparation of Test Samples

The following eight types of sample were prepared.

Sample 1: The tofu puree of the present invention, manufactured by the same method as in Example 1

Sample 2: The tofu puree of the present invention, manufactured by the same method as in Example 2

Sample 3: The tofu puree of the present invention, manufactured by the same method as in Example 3

Sample 4: A tofu paste manufactured by using a silent cutter to produce a paste from firm-type tofu (cotton-strained bean curd) manufactured by the same method as in Reference Example 2 according to the method of Example 1 in Prior Art 1

Sample 5: A paste manufactured by adding gluconic δ-lactone to soy milk manufactured by the same method as in Reference Example 1, coagulating, removing the water, and producing a paste with a high-speed cutter according to the method of Example 1 in Prior Art 2.

Sample 6: A paste manufactured by adding a coagulant to soy milk manufactured by the same method as in Reference Example 1, uniformly mixing, holding the mixture for 5 seconds at 80° C. to coagulate it, and producing a paste from the coagulated product with a homogenizer according to the method of Example 1 in Prior Art 3.

Sample 7: A paste manufactured by adding a coagulant to soy milk manufactured by the same method as in Reference Example 1, uniformly mixing, holding the mixture for 5 seconds at 80° C. to coagulate it, and producing a paste from the coagulated product with a homogenizer according to the method of Example 1 in Prior Art 3, except that the coagulant was the same as that in Example 1 of the present invention.

Sample 8: Soy milk manufactured by the same method as in Reference Example 1.

(2) Test Methods

The viscosity, dynamic storage modulus, dynamic loss modulus, average particle size, 90% particle size, texture, and taste of the samples were all measured and tested by the test methods described above.

(3) Test Results

The test results are given in Table 1. As is clear from Table 1, samples 1 to 3 of the present invention can be seen to have viscosity, dynamic storage modulus, dynamic loss modulus, average particle size, 90% particle size, texture, and taste that are all superior to those of samples 4 to 6 of the prior art.

Also, a comparison of sample 1 of the present invention to samples 6 and 7 reveals that temperature control in the pre-crushing step and the step in which the pre-crushed product is crushed is essential in order to manufacture a tofu puree with a superior texture.

Furthermore, a comparison of samples 1 to 3 of the present invention to sample 8 reveals that the samples of the present invention have a better texture than soy milk.

The type of soy milk and the type of tofu were suitably varied for further testing, but the results were substantially the same.

| Sample No. | Viscosity (mPa · s) | Dynamic storage modulus (Pa) | Dynamic loss modulus (Pa) | Average particle size (μm) | 90% particle size (μm) | Texture | Taste |
|---|---|---|---|---|---|---|---|
| 1 | 1100 | 14.5 | 8.7 | 13.4 | 23.1 | good | good |
| 2 | 233 | 1.5 | 1.1 | 4.8 | 8.0 | good | good |
| 3 | 74 | 1.0 | 0.9 | 4.2 | 6.8 | good | good |
| 4 | 5010 | 3700.0 | 1200.1 | 22.4 | 54.0 | poor | s. poor |
| 5 | 7200 | 3850.4 | 1400.2 | 16.2 | 49.1 | poor | poor |
| 6 | 430 | 1.9 | 1.9 | 17.4 | 42.4 | poor | s. poor |
| 7 | 410 | 0.5 | 0.4 | 18.1 | 43.0 | poor | s. poor |
| 8 | 9 | 1.3 | 1.3 | 0.9 | 10.4 | s. poor | s. poor |

[s. poor: somewhat poor]

Test Example 2

This test was conducted in order to examine the temperature conditions under which the coagulated soy milk is produced, while using, as indices, dynamic storage modulus, dynamic loss modulus, average particle size, 90% particle size, texture, and taste.

(1) Preparation of Test Samples

Other than changing the temperature conditions under which the coagulated soy milk was produced as shown in Table 2, five types of tofu puree sample were prepared by the same method as in Example 1.

(2) Test Methods

The viscosity, dynamic storage modulus, dynamic loss modulus, average particle size, 90% particle size, texture, and taste of the samples were all measured and tested by the test methods described above.

(3) Test Results

The test results are given in Table 2. As is clear from Table 2, the temperature at which the coagulated soy milk is produced must be between 40 and 90° C. in order to manufacture a tofu puree with superior viscosity, dynamic storage modulus, dynamic loss modulus, average particle size, 90% particle size, texture, and taste.

The type of soy milk, the type of coagulant, and the emulsifying dispersion means were suitably varied for further testing, and the results were substantially the same.

Test Example 3

This test was conducted in order to examine the need for the pre-crushing step, while using, as indices, the viscosity, dynamic storage modulus, dynamic loss modulus, average particle size, 90% particle size, texture, and taste.

(1) Preparation of Test Samples

Other than either including or excluding the pre-crushing step as shown in Table 3, six types of tofu puree sample were prepared by the same method as in Example 1, Example 2, or Example 3.

(2) Test Methods

The viscosity, dynamic storage modulus, dynamic loss modulus, average particle size, 90% particle size, texture, and taste of the samples were all measured and tested by the test methods described above.

(3) Test Results

The test results are given in Table 3. As is clear from Table 3, a pre-crushing step is necessary in order to manufacture a tofu puree with superior viscosity, dynamic storage modulus, dynamic loss modulus, average particle size, 90% particle size, texture, and taste.

| Production temp. (°C.) | Viscosity (mPa·s) | Dynamic storage modulus (Pa) | Dynamic loss modulus (Pa) | Average particle size (μm) | 90% particle size (μm) | Texture | Taste |
| --- | --- | --- | --- | --- | --- | --- | --- |
| 30 | 266 | 13.8 | 13.8 | 40.5 | 70.0 | poor | good |
| 40 | 680 | 18.8 | 16.6 | 14.2 | 31.9 | good | good |
| 60 | 1100 | 14.5 | 8.7 | 13.4 | 23.1 | good | good |
| 90 | 596 | 4.1 | 2.5 | 8.8 | 18.9 | good | good |
| 100 | 49 | 0.7 | 0.4 | 16.3 | 36.4 | poor | fair |

The type of soy milk, the type of coagulant, and the emulsifying dispersion means were suitably varied for further testing, and the results were substantially the same.

| | Viscosity (mPa·s) | Dynamic storage modulus (Pa) | Dynamic loss modulus (Pa) | Aver. part. size (μm) | 90%. part. size (μm) | Texture | Taste |
| --- | --- | --- | --- | --- | --- | --- | --- |
| Ex. 1 w/pre-crushing step | 1100 | 14.5 | 8.7 | 13.4 | 23.1 | good | good |
| Ex. 1 w/o pre-crushing step | 970 | 19.7 | 13.0 | 20.2 | 38.0 | poor | good |
| Ex. 2 w/pre-crushing step | 233 | 1.5 | 1.1 | 4.8 | 8.0 | good | good |
| Ex. 2 w/o pre-crushing step | 52 | 0.4 | 0.3 | 13.4 | 36.6 | poor | gdod |
| Ex. 3 w/pre-crushing step | 74 | 1.0 | 0.9 | 4.2 | 6.8 | good | good |
| Ex. 3 w/o pre-crushing step | 64 | 0.8 | 0.8 | 8.9 | 35.2 | poor | good |

Test Example 4

This test was conducted in order to examine the temperature conditions in the step in which the pre-crushed product is crushed, while using, as indices, the viscosity, dynamic storage modulus, dynamic loss modulus, average particle size, 90% particle size, texture, and taste.

(1) Preparation of Test Samples

Other than changing the temperature conditions in the step in which the pre-crushed product is crushed as shown in Table 4, five types of tofu puree sample were prepared by the same method as in Example 1.

(2) Test Methods

The viscosity, dynamic storage modulus, dynamic loss modulus, average particle size, 90% particle size, texture, and taste of the samples were all measured and tested by the test methods described above.

(3) Test Results

The test results are given in Table 4. As is clear from Table 4, the temperature in the step in which the pre-crushed product is crushed must be between 10 and 35° C. in order to manufacture a tofu puree with superior viscosity, dynamic storage modulus, dynamic loss modulus, average particle size, 90% particle size, texture, and taste.

The type of soy milk, the type of coagulant, and the emulsifying dispersion means were suitably varied for further testing, and the results were substantially the same.

| Temperature (° C.) | Viscosity (mPa · s) | Dynamic storage modulus (Pa) | Dynamic loss modulus (Pa) | Average particle size (μm) | 90% particle size (μm) | Texture | Taste |
|---|---|---|---|---|---|---|---|
| 5  | 453  | 13.6 | 9.0 | 11.4 | 40.6 | poor | good |
| 10 | 437  | 8.9  | 5.3 | 10.9 | 31.2 | good | good |
| 30 | 1100 | 14.5 | 8.7 | 13.4 | 23.1 | good | good |
| 35 | 565  | 11.5 | 6.9 | 15.0 | 33.8 | good | good |
| 40 | 347  | 1.8  | 1.7 | 25.8 | 80.5 | poor | good |

Test Example 5

This test was conducted in order to examine the crushing conditions (the range of the average particle size and the range of the 90% particle size for particles contained in the crushed product ultimately obtained, referred to as a tofu puree), while using, as indices, the viscosity, dynamic storage modulus, dynamic loss modulus, average particle size, 90% particle size, texture, and taste.

(1) Preparation of Test Samples

Other than varying the treatment pressure of the homogenizer as shown in Table 5, and thereby altering the crushing conditions in the step in which the pre-crushed product was crushed (the range of the average particle size and the range of the 90% particle size for particles contained in the tofu puree), five types of tofu puree sample were prepared by the same method as in Example 1.

(2) Test Methods

The viscosity, dynamic storage modulus, dynamic loss modulus, average particle size, 90% particle size, texture, and taste of the samples were all measured and tested by the test methods described above.

(3) Test Results

The test results are given in Table 5. As is clear from Table 5, the particles contained in the tofu puree must be crushed to an average particle size of 2 to 15 μm and a 90% particle size of 35 μm or less in order to manufacture a tofu puree with superior viscosity, dynamic storage modulus, dynamic loss modulus, average particle size, 90% particle size, texture, and taste.

The type of soy milk, the type of coagulant, and the emulsifying dispersion means were suitably varied for further testing, and the results were substantially the same.

| Average particle size (μm) | 90% particle size (μm) | Viscosity (mPa · s) | Dynamic storage modulus (Pa) | Dynamic loss modulus (Pa) | Texture | Taste |
|---|---|---|---|---|---|---|
| 1.0  | 10.0 | 6    | 0.1  | 0.1  | poor    | poor |
| 2.0  | 4.9  | 40   | 0.4  | 0.4  | good    | good |
| 13.4 | 23.1 | 1100 | 14.5 | 8.7  | good    | good |
| 15.0 | 35.0 | 450  | 14.4 | 12.0 | good    | good |
| 16.0 | 36.0 | 680  | 18.3 | 16.5 | s. poor | fair |

Test Example 6

This test was conducted in order to examine the physical and chemical properties common to tofu puree with superior texture and taste while using texture and taste as indices.

(1) Preparation of Test Samples

Other than varying the treatment pressure of the homogenizer as shown in Table 6 in the same manner as in the method for preparing the test samples in Test Example 6 above, and thereby altering the physical and chemical properties of the tofu puree, namely, its viscosity, dynamic storage modulus, and dynamic loss modulus, five types of tofu puree sample were prepared by the same method as in Example 1.

(2) Test Methods

The viscosity, dynamic storage modulus, dynamic loss modulus, average particle size, 90% particle size, texture, and taste of the samples were all measured and tested by the test methods described above.

(3) Test Results

The test results are given in Table 6. As is clear from Table 6, for a tofu puree to have superior texture and taste, its physical and chemical properties must be such that the particles contained in the tofu puree have an average particle size between 2 and 15 μm and a 90% particle size or 35 μm or less, in addition to which the viscosity must be 20 to 3000 mPa·s, the dynamic storage modules must be 0.2 to 600 Pa, and the dynamic loss modules must be 0.2 to 250 Pa.

The type of soy milk, the type of coagulant, and the emulsifying dispersion means were suitably varied for further testing, and the results were substantially the same.

| Viscosity (mPa·s) | Dynamic storage modulus (Pa) | Dynamic loss modulus (Pa) | Average particle size (μm) | 90% particle size (μm) | Texture | Taste |
|---|---|---|---|---|---|---|
| 10 | 0.1 | 0.1 | 1.0 | 10.2 | poor | good |
| 20 | 0.2 | 0.2 | 9.9 | 21.4 | good | good |
| 1100 | 14.5 | 8.7 | 13.4 | 23.1 | good | good |
| 3000 | 600.0 | 250.0 | 14.8 | 31.9 | good | good |
| 4000 | 647.5 | 258.6 | 21.2 | 38.5 | poor | poor |

Test Example 7

This test was conducted in order to examine the favorable range of the solids content of the soy milk used as a starting raw material, while using, as indices, the viscosity, dynamic storage modulus, dynamic loss modulus, average particle size, 90% particle size, texture, and taste.
(1) Preparation of Test Samples
Other than varying the solids content of the soy milk as shown in Table 7, five types of tofu puree sample were prepared by the same method as in Example 1.
(2) Test Methods
The viscosity, dynamic storage modulus, dynamic loss modulus, average particle size, 90% particle size, texture, and taste of the samples were all measured and tested by the test methods described above.
(3) Test Results
The test results are given in Table 7. As is clear from Table 7, the solids content of the soy milk must be within a range of 5 to 15% in order to manufacture a tofu puree with even better viscosity, dynamic storage modulus, dynamic loss modulus, average particle size, 90% particle size, texture, and taste.

The type of soy milk, the type of coagulant, and the emulsifying dispersion means were suitably varied for further testing, and the results were substantially the same.

| Soy milk solids (%) | Viscosity (mPa·s) | Dynamic storage modulus (Pa) | Dynamic loss modulus (Pa) | Average particle size (μm) | 90% particle size (μm) | Texture | Taste |
|---|---|---|---|---|---|---|---|
| 4 | 49 | 0.4 | 0.3 | 14.8 | 35.0 | fair | fair |
| 5 | 65 | 0.4 | 0.4 | 14.4 | 34.0 | good | good |
| 13 | 1100 | 14.5 | 8.7 | 13.4 | 23.1 | good | good |
| 15 | 2700 | 112.3 | 41.8 | 11.5 | 24.0 | good | good |
| 16 | 3000 | 142.2 | 49.4 | 12.3 | 27.1 | fair | fair |

Test Example 8

This test was conducted in order to examine the favorable range of the added amount of coagulant, while using, as indices, the viscosity, dynamic storage modulus, dynamic loss modulus, average particle size, 90% particle size, texture, and taste.

(1) Preparation of Test Samples

Other than varying the amount in which the coagulant was added with respect to the solids content of the soy milk as shown in Table 8, five types of tofu puree sample were prepared by the same method as in Example 1.

(2) Test Methods

The viscosity, dynamic storage modulus, dynamic loss modulus, average particle size, 90% particle size, texture, and taste of the samples were all measured and tested by the test methods described above.

(3) Test Results

The test results are given in Table 8. As is clear from Table 8, the range of the added amount of coagulant should be 1 to 7% with respect to the solids content of the soy milk in order to manufacture a tofu puree with improved viscosity, dynamic storage modulus, dynamic loss modulus, average particle size, 90% particle size, texture, and taste.

The type of soy milk, the type of coagulant, and the emulsifying dispersion means were suitably varied for further testing, and the results were substantially the same.

| Added coagulant (%) | Viscosity (mPa·s) | Dynamic storage modulus (Pa) | Dynamic loss modulus (Pa) | Average particle size (prn) | 90% particle size (μm) | Texture | Taste |
|---|---|---|---|---|---|---|---|
| 0.5 | 20 | 0.4 | 0.2 | 2.0 | 4.0 | fair | fair |
| 1 | 406 | 1.6 | 1.0 | 4.0 | 6.1 | good | good |
| 4 | 1100 | 14.5 | 8.7 | 13.4 | 23.1 | good | good |
| 7 | 571 | 13.4 | 7.8 | 14.7 | 23.4 | good | good |
| 8 | 372 | 20.2 | 18.2 | 15.0 | 35.0 | fair | fair |

Reference Example 1

60 kg of soybeans of American growth (IOM, imported by Mitsui Bussan) were washed and soaked for 12 hours in running water to swell the soybeans. These soaked soybeans and 170 kg of water were supplied to a grinder (made by Nagasawa Kikai Seisakusho) and ground to prepare approximately 220 kg of raw go (mash). This approximately 220 kg of mash was cooked for 4 minutes at 100° C. in a continuous cooking kettle (made by Nagasawa Kikai Seisakusho), subjected to a press (made by Arai Tokkosho) to separate the soy milk from the lees and to prepare approximately 190 kg of soy milk. The soy milk thus obtained contained approximately 13% solids.

Reference Example 2

In the same manner as in Reference Example 1 above, 60 kg of soybeans of American growth were soaked, and these soaked soybeans and 570 kg of water were supplied to a grinder and ground to prepare approximately 620 kg of raw go (mash). This approximately 620 kg of mash was cooked for 4 minutes at 100° C. in a continuous cooking kettle, subjected to a press to separate the soy milk from the lees and to prepare approximately 600 kg of soy milk. The soy milk thus obtained contained approximately 4.5% solids.

Calcium sulfate (made by Tomita Seiyaku) suspended in lukewarm water was added and mixed in a concentration of 7.8% with respect to the soy milk solids with 100 kg of the above-mentioned soy milk being cooled to between 70 and 75° C., and this mixture was allowed to stand 10 minutes. The coagulated product thus obtained was lightly broken up, transferred to a mold and squeezed for 20 minutes to manufacture approximately 80 kg of tofu. This tofu was taken out, cooled with water, and cut. The firm tofu thus obtained had a water content of approximately 87%.

Figure 1:
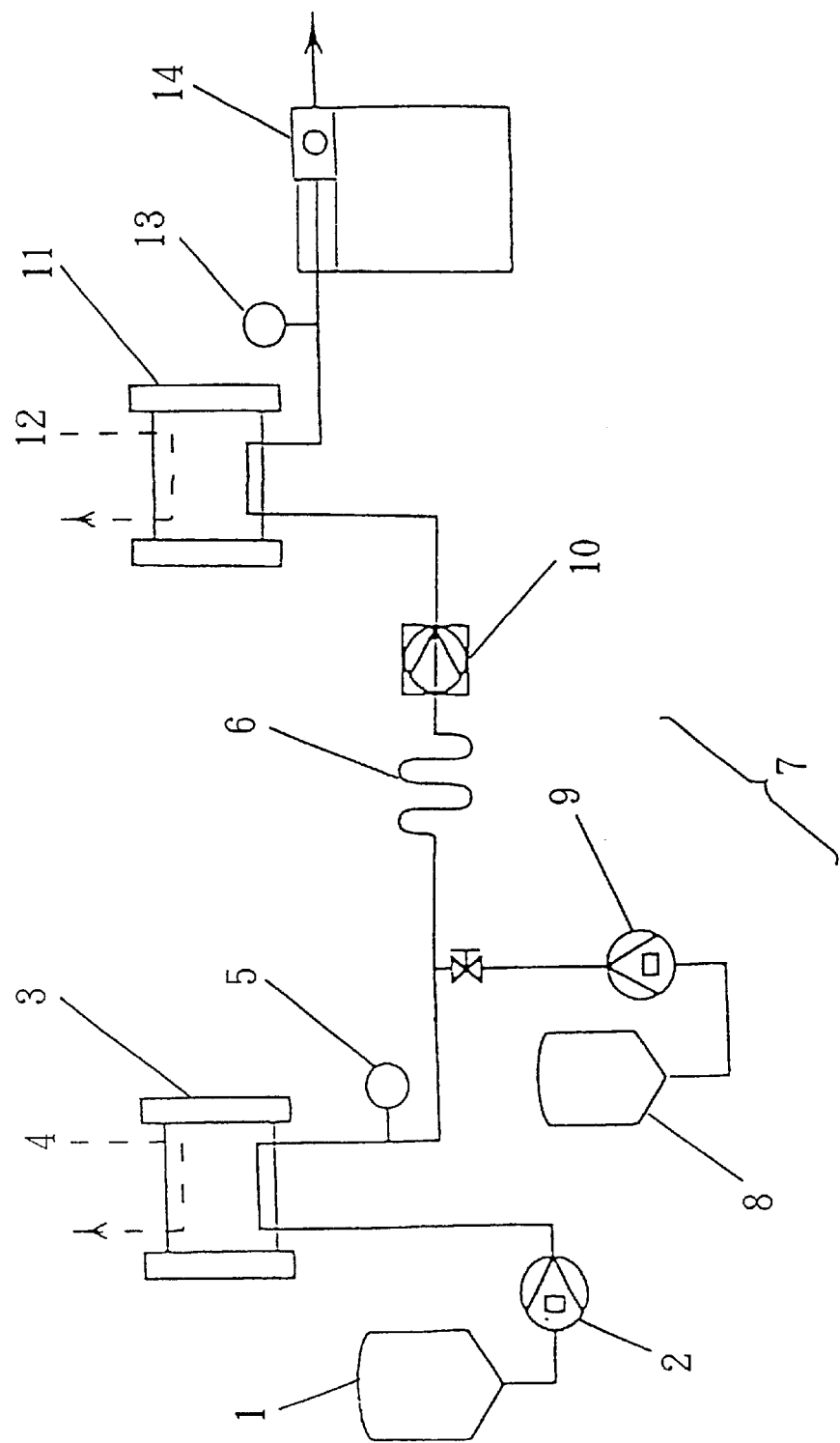
FIG. 1 is a diagram of an example of the apparatus of the present invention for manufacturing a tofu puree.

DESCRIPTION OF SYMBOLS 1 raw material tank
2 metering pump
3 heating means (plate heater)
4 heat source
5 temperature controller
6 holding pipe
7 coagulant supply means
8 coagulant tank
9 metering pump
10 first emulsifying dispersion means Milder®
11 cooling means (plate cooler)
12 coolant
13 temperature controller
14 second emulsifying dispersion means (homogenizer)

DESCRIPTION OF THE PREFERRED EMBODIMENTS

The present invention will now be described in further detail by giving examples, but the present invention is not limited to or by the following examples.

EXAMPLE 1

FIG. 1 is a diagram of an example of the apparatus of the present invention for manufacturing a tofu puree.

In FIG. 1, the apparatus of the present invention for manufacturing a tofu puree comprises a raw material tank 1 (stainless steel, made by Morinaga Engineering Co., Ltd.), a heating means 3 (plate heater, made by Morinaga Engineering Co., Ltd.), a holding pipe 6 (made by Morinaga Engineering Co., Ltd.), a first emulsifying dispersion means 10 (milder, made by Ebara Seisakusho), a cooling means 11 (plate cooler, made by Morinaga Engineering Co., Ltd.), and a second emulsifying dispersion means 14 (homogenizer, made by Sanmaru Kikai Kogyo).

A coagulant supply means 7 (made by Morinaga Engineering Co., Ltd.) for supplying a coagulant is linked between the eating means 3 and the holding pipe 6.

The tofu puree manufacturing apparatus in FIG. 1 is provided with piping and equipment for sterilizing the passageways ahead of time at some point prior to the manufacture of the tofu puree, and with piping and equipment for cleaning the passageways after the manufacture of the tofu puree, although these are not shown in the figure. Also provided but not shown in the figures are various pressure gauges and thermometers for monitoring the pressure and liquid temperature inside the piping, and equipment for automatically controlling the pressure, temperature, and so forth at various locations. In addition, piping for returning the liquid from the various outlet pipes to the inlet pipes if the manufacturing conditions are not met, mixers for uniformly mixing the raw material soy milk, bypass pipes that are needed in the event of an emergency, during a maintenance inspection, and so on, flux regulator valves needed for regulating the flux at midpoints along the passageways, and other such piping and equipment are provided to the heating means 3, the first emulsifying dispersion means 11, the cooling means 12, and the second emulsifying dispersion means 15, although none of these is depicted in the figure.

The function of the tofu puree manufacturing apparatus shown in FIG. 1 will now be described on the basis of the method of the present invention for manufacturing a tofu puree.

100 kg of soy milk with a solids content of 13% and a temperature of 10° C. manufactured by the same method as in Reference Example 1 and contained in the raw material tank 1 was pumped to the heating means 3 by the metering pump 2 (made by Nakakin), which was equipped with a flux regulator valve. The soy milk that flowed into the heating means 3 was heated by hot water (the heat source 4), kept at 60° C. by the temperature controller 5 (made by Yokokawa Electric), and pumped toward the holding pipe 6 at a constant flux (28 mL/second).

A coagulant (magnesium chloride, made by Nichia Chemical Industries) contained in the coagulant tank 8 (made by Morinaga Engineering Co., Ltd.) of the coagulant supply means 7 was supplied at a flux (0.4 mL/second) that corresponded to an added amount of 4% with respect to the soy milk solids, to 60° C. soy milk that was being pumped at a constant flux (28 mL/second) from the heating means 3 by the metering pump 9 (made by FMI; equipped with a flux regulator valve). The coagulant was uniformly mixed with the soy milk, and this mixture was held for 3 seconds at 60° C. by the holding pipe 6, which produced a coagulated product, which was transferred to the first emulsifying dispersion means 10 (Milder®, made by Ebara Seisakusho).

The coagulated soy milk that flowed into the first emulsifying dispersion means 10 (Milder®, made by Ebara Seisakusho) was immediately pre-crushed to an average particle size of 20 $\mu$m at a milder speed of 12,000 rpm, and then transferred to the cooling means 11. The pre-crushed product transferred to the cooling means 11 was cooled by cooling water (the coolant 12), kept at 30° C. by the temperature controller 13 (made by Yokokawa Electric), and transferred to the second emulsifying dispersion means 14 (homogenizer, made by Sanmaru Kikai Kogyo).

The pre-crushed product transferred to the second emulsifying dispersion means 14 (homogenizer, made by Sanmaru Kikai Kogyo) was immediately crushed to an average particle size of 13.4 $\mu$m and a 90% particle size of 23.1 $\mu$m at a treatment pressure of 12 MPa.

The tofu puree thus obtained had a viscosity of 1100 mPa·s, a dynamic storage modulus of 14.5 Pa, and a dynamic loss modulus of 8.7 Pa, and the particles contained in the tofu puree had an average size of 13.4 $\mu$m and a 90% particle size of 23.1 $\mu$m. This tofu puree had no graininess, a superior texture, and a good taste.

EXAMPLE 2

An example of a method for manufacturing a tofu puree using the same tofu puree manufacturing apparatus as in Example 1 above, but with some of the manufacturing conditions changed, will now be described.

100 kg of soy milk with a solids content of 13% and a temperature of 10° C. manufactured by the same method as in Reference Example 1 and contained in the raw material tank 1 was pumped to the heating means 3 and heated to 80° C. by the heating means 3. A coagulant (magnesium chloride, made by Nichia Chemical Industries) was added to this and uniformly mixed by the coagulant supply means 7 in a proportion of 4% with respect to the soy milk solids, and this mixture was held for 3 seconds at 80° C. by the holding pipe 6, which produced a coagulated product.

This coagulated soy milk was immediately pre-crushed by the first emulsifying dispersion means 10 to an average particle size of 10 μm at a Milder® speed of 12,000 rpm, an then transferred to the cooling means 11, and cooled to 30° C. by the cooling means 11.

This pre-crushed product was immediately crushed by the second emulsifying dispersion means 14 to an average particle size of 4.8 μm and a 90% particle size of 8.0 μm at a treatment pressure of 3 MPa.

The tofu puree thus obtained had a viscosity of 233 mPa·s, a dynamic storage modulus of 1.5 Pa, and a dynamic loss modulus of 1.1 Pa, and the particles contained in the tofu puree had an average size of 4.8 μm and a 90% particle size of 8.0 μm. This tofu puree had no graininess, a superior texture, and a good taste, just as with the tofu puree obtained by the manufacturing method of Example 1.

EXAMPLE 3

An example of a method for manufacturing a tofu puree using the same tofu puree manufacturing apparatus as in Example 1 above, but with some of the manufacturing conditions changed, will now be described.

100 kg of soy milk with a solids content of 10% and a temperature of 10° C. manufactured by substantially the same method as in Reference Example 1 and contained in the raw material tank 1 was pumped to the heating means 3 and heated to 85° C. by the heating means 3. A coagulant (magnesium chloride, made by Nichia Chemical Industries) was added to this and uniformly mixed by the coagulant supply means 7 in a proportion of 3% with respect to the soy milk solids, and this mixture was held for 5 seconds at 85° C. by the holding pipe 6, which produced a coagulated product.

This coagulated soy milk was immediately pre-crushed by the first emulsifying dispersion means 10 to an average particle size of 14 μm at a Milder® speed of 12,000 rpm, and then transferred to the cooling means 11, and cooled to 30° C. by the cooling means 11.

This pre-crushed product was immediately crushed by the second emulsifying dispersion means 14 to an average particle size of 4.2 μm and a 90% particle size of 6.8 μm at a treatment pressure of 12 MPa.

The tofu puree thus obtained had a viscosity of 74 mPa·s, a dynamic storage modulus of 1.0 Pa, and a dynamic loss modulus of 0.9 Pa, and the particles contained in the tofu puree had an average size of 4.2 μm and a 90% size of 6.8 μm. This tofu puree had no graininess, a superior texture, and a good taste, just as with the tofu puree obtained by the manufacturing method of Example 1.

INDUSTRIAL APPLICABILITY

As detailed above, the present invention relates to a tofu puree and a method and apparatus for manufacturing this tofu puree, and the following benefits are realized with the present invention.

1) it is possible to manufacture a tofu puree having the specified physical and chemical properties, no graininess, a superior texture, and a good taste.

2) a tofu puree can be manufactured continuously, on a manufacturing line, and in large quantity by the tofu puree manufacturing apparatus of the present invention, which expands the range of applications to various foods.

What is claimed is:

1. A tofu puree having the following physical and chemical properties (a) to (d):
   (a) viscosity is 20 to 3000 mPa·s;
   (b) dynamic storage modulus is 0.2 to 600 Pa;
   (c) dynamic loss modulus is 0.2 to 250 Pa; and
   (d) particles contained in the tofu puree have an average particle size of 2 to 15 μm and a 90% particle size of 35 μm or less.

2. A method for manufacturing a tofu puree, which comprises adding a coagulant to soy milk, holding a temperature thereof at 40 to 90° C. to form a coagulated product, pre-crushing this coagulated product by first emulsifying dispersion means to obtain a pre-crushed product, cooling the product to between 10° C. and 35° C., and crushing this pre-crushed product by second emulsifying dispersion means to an average particle size of 2 to 15 μm and a 90% particle size of 35 μm or less.

3. The method for manufacturing a tofu puree according to claim 2, wherein the solids content of the soy milk is 5 to 15 wt %.

4. The method for manufacturing a tofu puree according to claim 2 or 3, wherein the coagulant is a substance selected from the group consisting of gluconic δ-lactone, calcium acetate, calcium gluconate, calcium lactate, calcium sulfate, calcium chloride, magnesium chloride and a mixture of two or more of these substances.

5. The method of manufacturing a tofu puree according to claim 2, wherein the amount of the coagulant to be added is 1 to 7 wt % with respect to the soy milk solids.

6. An apparatus for manufacturing a tofu puree, comprising a system in which a raw material tank, heating means, a holding pipe, first emulsifying dispersion means, cooling means, and second emulsifying dispersion means are arranged in that order, and coagulant supply means for supplying a coagulant, said coagulant supply means being linked between the heating means and the holding pipe.

7. The apparatus for manufacturing a tofu puree according to claim 6, wherein the first emulsifying dispersion means is a shear pump or a Milder® dispersion means.

8. The apparatus for manufacturing a tofu puree according to claim 6, wherein the first emulsifying dispersion means is a homogenizer, a shear pump, or a Milder® dispersion means.

* * * * *